United States Patent
Zhang et al.

(10) Patent No.: US 11,425,676 B2
(45) Date of Patent: Aug. 23, 2022

(54) METHODS AND NODES FOR MANAGING POSITION INFORMATION ASSOCIATED WITH A GROUP OF WIRELESS DEVICES

(71) Applicant: Telefonaktiebolaget LM Ericsson (publ), Stockholm (SE)

(72) Inventors: Xin Zhang, Unterhaching (DE); Samuel Axelsson, Linköping (SE); Fredrik Gunnarsson, Linköping (SE); Kjell Larsson, Luleå (SE); Jawad Manssour, Seoul (KR); Sara Modarres Razavi, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/331,163

(22) PCT Filed: Jun. 12, 2018

(86) PCT No.: PCT/SE2018/050611
§ 371 (c)(1),
(2) Date: Mar. 7, 2019

(87) PCT Pub. No.: WO2019/240635
PCT Pub. Date: Dec. 19, 2019

(65) Prior Publication Data
US 2020/0128506 A1    Apr. 23, 2020

(51) Int. Cl.
*H04W 64/00* (2009.01)
*H04W 4/02* (2018.01)
(Continued)

(52) U.S. Cl.
CPC ......... *H04W 64/003* (2013.01); *G01S 5/0289* (2013.01); *G01S 5/14* (2013.01); *H04W 4/027* (2013.01); *H04W 64/006* (2013.01)

(58) Field of Classification Search
None
See application file for complete search history.

(56) References Cited

U.S. PATENT DOCUMENTS

| | | |
|---|---|---|
| 2004/0214584 A1 | 10/2004 | Marinier |
| 2006/0267841 A1 | 11/2006 | Lee et al. |

(Continued)

FOREIGN PATENT DOCUMENTS

| | | |
|---|---|---|
| EP | 2602633 A1 | 6/2013 |
| WO | 2004008171 A1 | 1/2004 |

(Continued)

OTHER PUBLICATIONS

3GPP, "3rd Generation Partnership Project; Technical Specification Group Radio Access Network NR Radio Resource Control (RRC) protocol specification (Release 15)", 3GPP TS 38.331 V15.0.0, Dec. 2017, 1-188.

(Continued)

*Primary Examiner* — Peter Chen
*Assistant Examiner* — Jeff Banthrongsack
(74) *Attorney, Agent, or Firm* — Sage Patent Group

(57) ABSTRACT

Methods and nodes (110; 115; 116; 117; 120; 121; 130; 140) for managing position information associated with a group of wireless devices (120-121) configured to be served in a wireless communication network (100). It is obtained (201; 301-303; 501; 501*a-b*) information indicating a first wireless device (120) as member and positioning representative of the group and at least one other, second, wireless device (121) as further member of the group. Said at least one second wireless device (121) being able to communicate wirelessly and directly with the first wireless device (120) over a direct communication link (125). A position of said at least one second wireless device (121) is estimated based on (Continued)

communication of positioning supporting information over said direct communication link (125).

16 Claims, 8 Drawing Sheets

(51) Int. Cl.
    *G01S 5/02*     (2010.01)
    *G01S 5/14*     (2006.01)

(56) References Cited

U.S. PATENT DOCUMENTS

| | | |
|---|---|---|
| 2013/0045759 A1 | 2/2013 | Smith |
| 2013/0116908 A1 | 5/2013 | Oh et al. |
| 2015/0208431 A1 | 7/2015 | Chen et al. |
| 2017/0367067 A1* | 12/2017 | Hwang ............. H04W 52/0219 |
| 2019/0268726 A1* | 8/2019 | Jiang ................... H04W 4/029 |

FOREIGN PATENT DOCUMENTS

| | | |
|---|---|---|
| WO | 2014158062 A1 | 10/2014 |
| WO | 2017148531 A1 | 9/2017 |

OTHER PUBLICATIONS

3GPP, "3rd Generation Partnership Project; Technical Specification Group Radio Access Network; Evolved Universal Terrestrial Radio Access (E-UTRA); LTE Positioning Protocol A (LPPa); (Release 14)", 3GPP TS 36.455 V14.4.0, Dec. 2017, 1-75.

3GPP, "3rd Generation Partnership Project; Technical Specification Group Radio Access Network; NG-RAN Architecture description (Release 15)", 3GPP TS 38.401 V15.0.0, Dec. 2017, 1-23.

3GPP, "3rd Generation Partnership Project; Technical Specification Group Radio Access Network; NG-RAN; NR Positioning Protocol A (NRPPa) (Release 15)", 3GPP TS 38.455 V0.6.0, Mar. 2018, 1-46.

3GPP, "3rd Generation Partnership Project; Technical Specification Group Radio Access Network; NR; NR and NG-RAN Overall Description; Stage 2 (Release 15)", 3GPP TS 38.300 V15.0.0, Dec. 2017, 1-68.

Unknown, Author, "TS 38.455 v0.6.0 covering agreements of RAN3#99", 3GPP TSG-RAN WG3 #99, R3-181595, Athens, Greece, Feb. 26-Mar. 2, 2018, 1-1.

Extended European Search Report for European Patent Application No. 18922666.5 dated Dec. 20, 2021, 7 pages.

\* cited by examiner

METHODS AND NODES FOR MANAGING POSITION INFORMATION ASSOCIATED WITH A GROUP OF WIRELESS DEVICES

CROSS-REFERENCE TO RELATED APPLICATIONS

This application is a 35 U.S.C. § 371 national stage application of PCT International Application No. PCT/SE2018/050611 filed on Jun. 12, 2018, the disclosure and content of which is incorporated by reference herein in their entirety.

TECHNICAL FIELD

Embodiments herein relate to method and nodes for managing position information associated with a group of wireless devices configured to be served in a wireless communication network, e.g. telecommunication network.

BACKGROUND

Communication devices such as wireless communication devices, that simply may be named wireless devices, may also be known as e.g. user equipments (UEs), mobile terminals, wireless terminals and/or mobile stations. A wireless device is enabled to communicate wirelessly in a wireless communication network, that alternatively e.g. may be named cellular communication network, wireless communication system, radio communication system, cellular radio system, cellular network or cellular communication system. The communication may be performed e.g. between two wireless devices, between a wireless device and a regular telephone and/or between a wireless device and a server via a Radio Access Network (RAN) and possibly one or more core networks, comprised within the cellular communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. devices that are not associated with a conventional user. The wireless device may be, for example, portable, pocket-storable, hand-held, computer-comprised, or vehicle-mounted mobile device, enabled to communicate voice and/or data, via the RAN, with another entity, such as another wireless device or a server. The wireless communication network covers a geographical area in which radio coverage is provided and enables wireless devices to connect and communicate in the network. The area may be divided into subareas, e.g. cell areas, wherein each subarea is served by at least one base station, or Base Station (BS), e.g. a Radio Base Station (RBS), which sometimes may be referred to as e.g. "eNB", "eNodeB", "NodeB", "B node", or BTS (Base Transceiver Station), gNB, depending on the technology and terminology used. The base stations may be of different classes such as e.g. macro eNodeB, home eNodeB or pico base station, based on transmission power and thereby also cell size. The base station at a base station site typically provides radio coverage for one or more cells. A cell is typically identified by one or more cell identities and may be associated with a geographical area where radio coverage for that cell is provided by the base station at the base station site. Cells may overlap so that several cells cover the same geographical area. By the base station providing or serving a cell is meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

UMTS is a 3G, or third generation, mobile communication system, which evolved from Global System for Mobile communications (GSM) that belongs to the so called 2nd generation or 2G. UMTS provides improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3G mobile telecommunication networks utilizing WCDMA. Such networks may be named WCDMA/HSPA.

The 3rd Generation Partnership Project (3GPP) has further evolved the UTRAN and GSM based radio access network technologies, for example into evolved UTRAN (E-UTRAN) used in Long Term Evolution (LTE) that is a 4G, i.e. $4^{th}$ generation, mobile communication system.

3GPP is also involved in standardizing yet another new generation wide area networks, which may be referred to as fifth generation (5G). 5G New Radio (5G NR), or simply NR, is the new radio air interface being developed for 5G. However, NR may also be used to denote 5G in general. Another acronym being used to denote 5G is Next Generation (NG). The first release of a set of 5G standard specifications was Release 15, in late 2017. See e.g. "NG-RAN—Architecture description", 3GPP TS 38.401 v.15.0.0. for an overview of the architecture, and e.g. "NR Radio Resource Control (RRC) protocol specification", 3GPP TS 38.331 v.15.0.0.

A design principle for 5G is ultra-lean design. This i.a. implies that "always on signals" shall be avoided in the network as much as possible. A benefit from this design principle is to enable lower network energy consumption, better scalability, higher degree of forward compatibility, lower interference from system overhead signals and consequently higher throughput in low load scenario, and also improved support for user centric beam-forming.

Advanced Antenna Systems (AAS) is an area where technology has advanced significantly in recent years and where it is also foreseen a rapid technology development also in the years to come. Advanced antenna systems in general, and massive Multiple Input Multiple Output (MIMO) transmission and reception in particular are beneficially used for 5G.

As beam-forming becomes increasingly popular and capable, it becomes natural to use it not only for transmission of data but also for transmission of control information and synchronization signals.

One of the distinguishing characteristics of 5G, i.e. NR, is the frequency range of 5G deployments. More precisely, 5G can allow for frequency deployments from 0 up to 100 GHz. Operation in higher frequencies makes it possible to use smaller antenna elements as well as antennas with larger maximum electrical distance between antenna elements compared to antennas with the same physical size at lower frequencies. This facilitates beamforming, where the larger maximum electrical distance between antenna elements in combination with multiple antenna elements are used to form narrower beams with higher antenna gain than at lower frequencies and thereby compensate for the challenging propagation properties at higher frequencies. A beam is considered narrower than another beam if its radiation is focused in a smaller, possibly discontinuous, total angular range than the other beam. For these reasons, it is widely accepted that 5G will massively rely on beamforming to provide coverage, which sometimes make people call it a beam-based system.

Positioning has been a topic in LTE standardization since 3GPP Release 9. In Release 14, positioning has been extended to support Internet of Things (IoT) use cases, such as wearable devices, asset tracking and environment monitoring. In upcoming releases, e.g. Release 16 and beyond, positioning may be extended further to support Vehicle-to-everything (V2X) communication, including e.g. Vehicle-to-Infrastructure (V2I), Vehicle-to-Vehicle (V2V). V2X is in general communication involving the passing of information from a vehicle to any entity that may affect the vehicle, and vice versa. V2X communication is originally based on WLAN technology and works directly between vehicles, which form a vehicular ad-hoc network as two V2X senders come within each other's range. The radio technology is thus part of the WLAN IEEE 802.11 family of standards. 3GPP has announced a first set of LIE-Vehicle (LTE-V) physical layer standards for V2I and V2V communication to be based on a radio technology different from IEEE 802.11 WLAN.

Platooning refers to a group of vehicles that share a common mobility pattern and exchange data in order to improve road safety and road capacity and is one popular scenario with large potential business value in V2X communication.

Positioning can help either in the formation of the platoon or in the tracking of vehicles. A challenge in this scenario lies in the efficient and effective management of exchanged information and aiding positioning.

In the LIE standards, the following techniques are supported regarding positioning of a wireless device and corresponding or similar techniques are reviewed for 5G or even planned:

- Enhanced Cell Identity (ID), Essentially cell ID information to associate a wireless device to the serving area of a serving cell, and then additional information to determine a finer granularity position.
- Assisted Global Navigation Satellite Systems (GNSS). GNSS information retrieved by the wireless device, supported by assistance information provided to the wireless device from an Evolved Serving Mobile Location Center (E-SMLC).
- OTDOA (Observed Time Difference of Arrival). The wireless device estimates the time difference of reference signals from different base stations and sends to an E-SMLC for multilateration.
- Uplink TDOA (UTDOA). The wireless device is requested to transmit a specific waveform that is detected by multiple location measurement units, e.g. an eNB, at known positions. These measurements are forwarded to the E-SMLC for multilateration.

However, in 5G, with the above-mentioned radio beam based communication, positioning can also be based on estimation using e.g. angular information derived from beam information and distance based on ranging. An advantage of using beam information and ranging for positioning estimation is that there is less dependence on the synchronization of the network.

A 5G system based on AAS typically comprises:
Receiver Diversity
a Transmit Diversity
Multiple Input Multiple Output (MIMO)
Fixed Multi-beam
Adaptive beam-forming In such system, base stations may send out multiple beams towards a wireless device. The wireless device may measure and obtain information about these beams, i.e. beam information, e.g. regarding received beam power and transmitted beam power. The beam information may comprise information on beam reference power, beam index, and beam angle.

SUMMARY

In view of the above, an object is to provide one or more improvements regarding positioning in wireless communication networks.

For new generations of wireless communication networks, such as 5G, the above-mentioned conventional methods may require more overhead than desirable, or even reasonable, to implement or it may not be able to provide positioning to all wireless devices that need it. Reasons for this are that said conventional methods provide positioning per wireless device, in combination with the scalability of the new generation of networks and that the number of wireless devices served are expected to increase exponentially. There may also be more wireless devices with reduced capabilities, e.g. regarding positioning. Positioning support per wireless device may therefore be difficult to provide and/or guarantee both from the network and wireless device side. Further is spectrum efficiency always desirable to improve and the new generation of networks are typically designed with this in mind, but positioning signalling per wireless device in varying and possibly large numbers are not suppo g this very well.

According to a first aspect of embodiments herein, the object is achieved by a method, performed by one or more nodes relating to a wireless communication network, for managing position information associated with a group of wireless devices configured to be served in the wireless communication network. Said one or more nodes obtain information indicating a first wireless device as member and positioning representative of the group and at least one other, second, wireless device as further member of the group. Said at least one second wireless device being able to communicate wirelessly and directly with the first wireless device over a direct communication link. Said one or more nodes then receives, from the first wireless device, group position information being position information associated with the group and relating to at least an estimated position of said at least one second wireless device. The estimated position being based on communication of positioning supporting information over said direct communication link.

According to a second aspect of embodiments herein, the object is achieved by a computer program comprising instructions that when executed by a processing circuit causes one or more nodes of the wireless communication network to perform the method according to the first aspect.

According to a third aspect of embodiments herein, the object is achieved by a carrier comprising the computer program according to the second aspect, wherein the carrier is one of an electronic signal, optical signal, radio signal or computer readable storage medium.

According to a fourth aspect of embodiments herein, the object is achieved by one or more nodes for managing position information associated with a group of wireless devices configured to be served in a wireless communication network. Said one or more nodes are configured to obtain information indicating a first wireless device as member and positioning representative of the group and at least one other, second, wireless device as further member of the group. Said at least one second wireless device being able to communicate wirelessly and directly with the first wireless device over a direct communication link. Said one or more nodes are further configured to receive, from the first wireless device, group position information being position information associated with the group and relating to at least an estimated position of said at least one second wireless device. The estimated position being based on communication of positioning supporting information over said direct communication link.

According to a fifth aspect of embodiments herein, the object is achieved by a method, performed by a first wireless device, for managing position information associated with a group of wireless devices configured to be served in a wireless communication network. The first wireless device obtains information indicating the first wireless device as member and positioning representative of the group and indicating at least one other, second, wireless device as further member of the group. Said at least one second wireless device being able to communicate wirelessly and directly with the first wireless device over a direct communication link. Said first wireless device further receives, from said at least one second wireless device over said direct communication link, estimated position information comprising an estimated position of said at least one second wireless device. Said estimated position being based on communication of positioning supporting information over said direct communication link.

According to a sixth aspect of embodiments herein, the object is achieved by a computer program comprising instructions that when executed by a processing circuit causes the first wireless device to perform the method according to the fifth aspect.

According to a seventh aspect of embodiments herein, the object is achieved by a carrier comprising the computer program according to the sixth aspect, wherein the carrier is one of an electronic signal, optical signal, radio signal or computer readable storage medium.

According to an eight aspect of embodiments herein, the object is achieved by a first wireless device for managing position information associated with a group of wireless devices configured to be served in a wireless communication network. The first wireless device is configured to obtain information indicating the first wireless device as member and positioning representative of the group and indicating at least one other, second, wireless device as further member of the group. Said at least one second wireless device being able to communicate wirelessly and directly with the first wireless device over a direct communication link. Said first wireless device is further configured to receive, from said at least one second wireless device over said direct communication link, estimated position information comprising an estimated position of said at least one second wireless device. Said estimated position being based on communication of positioning supporting information over said direct communication link.

According to a ninth aspect of embodiments herein, the object is achieved by a method, performed by a second wireless device, for managing position information associated with a group of wireless devices configured to be served in a wireless communication network. The second wireless device obtains information indicating a first wireless device as member and positioning representative of the group and indicating said second wireless device as further member of the group. Said at least one second wireless device being able to communicate wirelessly and directly with the first wireless device over a direct communication link. The second wireless device sends, to said first wireless device over said direct communication link, estimated position information comprising an estimated position of said at least one second wireless device. The estimated position being based on communication of positioning supporting information over said direct communication link.

According to a tenth aspect of embodiments herein, the object is achieved by a computer program comprising instructions that when executed by a processing circuit causes the second wireless device to perform the method according to the ninth aspect.

According to an eleventh aspect of embodiments herein, the object is achieved by a carrier comprising the computer program according to the ninth aspect, wherein the carrier is one of an electronic signal, optical signal, radio signal or computer readable storage medium.

According to a twelfth aspect of embodiments herein, the object is achieved by a second wireless device, for managing position information associated with a group of wireless devices configured to be served in a wireless communication network. The second wireless device is configured to obtain information indicating a first wireless device as member and positioning representative of the group and indicating said second wireless device as further member of the group. Said at least one second wireless device being able to communicate wirelessly and directly with the first wireless device over a direct communication link. The second wireless device is further configured to send, to said first wireless device over said direct communication link, estimated position information comprising an estimated position of said at least one second wireless device. The estimated position being based on communication of positioning supporting information over said direct communication link.

Hence, as should be understood from the above and thanks to embodiment herein, network assisted positing needs only be provided to the first wireless device acting as positioning representative and is not needed to be provided to the rest of the group, e.g. the second wireless device, but in practice typically multiple second wireless devices. Still they may benefit from network assisted positioning and/or positioning capabilities of the first wireless device via the positioning aiding information over the direct communication link. Further, the wireless communication network may still be informed about the estimated position of the second wireless device since information on this can be sent to the wireless communication network over the direct communication link via the first wireless device to the wireless communication network.

It is realized that the above enables offloading the network, improving spectrum utilization, reducing the need of implementing overhead to be able to support large numbers of wireless devices with network positioning etc. Further, wireless devices that themselves are less capable of positioning may even be able to provide improved estimation of their own position thanks to that they may benefit from the capabilities of the positioning representative of the group, i.e. here the first wireless device, which may correspond to a platoon leader.

In other words, embodiments herein provide improvements regarding positioning in wireless communication networks.

BRIEF DESCRIPTION OF THE DRAWINGS

Examples of embodiments herein are described in more detail with reference to the appended schematic drawings, which are briefly described in the following.

DETAILED DESCRIPTION

As part of the development towards embodiments herein, the situation indicated in the Background will first be further elaborated upon.

For new generations of wireless communication networks, such as 5G, the above-mentioned conventional methods may require more overhead than desirable, or even reasonable, to implement or it may not be able to provide positioning to all wireless devices that need it. Reasons for this are that said conventional methods provide positioning per wireless device, in combination with the scalability of the new generation of networks and that the number of wireless devices served are expected to increase exponentially. There may also be more wireless devices with reduced capabilities, e.g. regarding positioning. Positioning support per wireless device may therefore be difficult to provide and/or guarantee both from the network and wireless device side. Further is spectrum efficiency always desirable to improve and the new generation of networks are typically designed with this in mind, but positioning signalling per wireless device in varying and possibly large numbers are not supporting this very well.

An idea that is underlying embodiments herein is therefore to introduce group positing in wireless communication networks, where a positioning representative of a group of wireless devices provide positioning aiding information to, and via direct communication with, the other wireless devices of the group. The positioning representative may e.g. provide the position aiding information based on estimation of its own position using conventional methods. The other wireless devices can then use the positioning aiding information to estimate their position, without the need to communicate directly with the network at least regarding positioning. Instead they can communicate result from their position estimation to the positioning representative, so it e.g. can communicate the estimated position to the network. Further, the other wireless devices of the group can this way benefit from positioning capabilities of the representative that may be better than those of the other wireless devices, even if they would communicate directly with the network regarding positioning.

Figure 1:
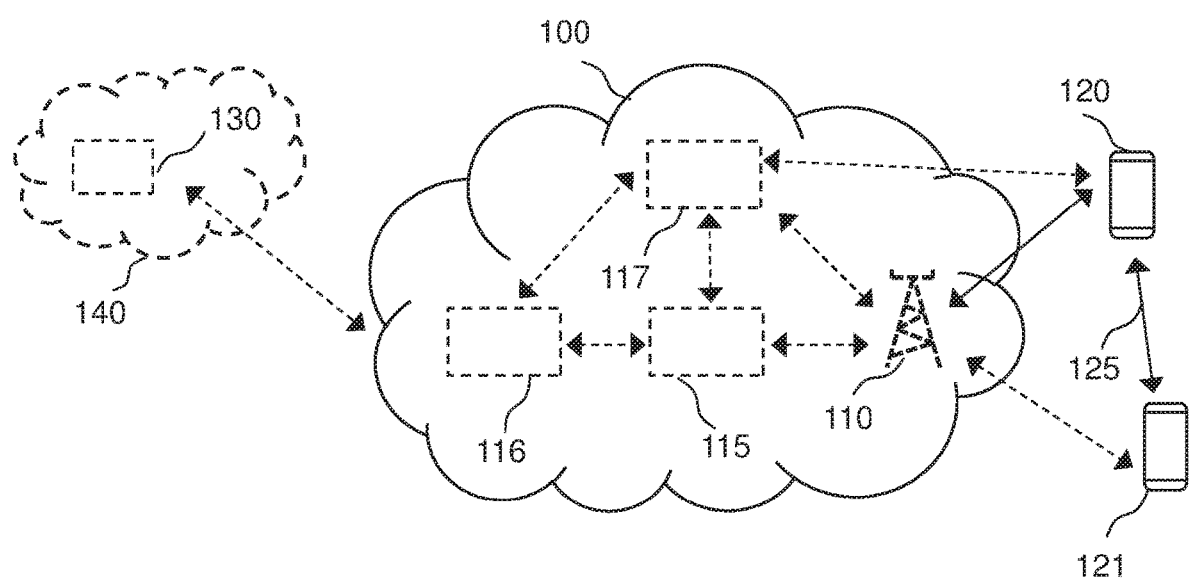
FIG. 1 is a block diagram schematically depicting an example of a wireless communication network in relation to which embodiments herein will be exemplified and may be implemented.

FIG. 1 schematically depicts, among other things, a simplified example of a wireless communication network 100, e.g. a telecommunication network, in which embodiments herein may be implemented. The wireless communication network 200 may e.g. be a 5G, or NR, wireless communication network. The figure further shows an example of a first wireless device 120 and a second wireless device 120 for wireless communication in the wireless communication network 100. The wireless communication network 100 comprises a radio network node 110 such as base station that in case of 5G may be named gNB. The radio network node 110 may be part of a Radio Access Network (RAN) of the wireless communication network 100.

The wireless communication network 100 comprises further network nodes that may be involved in positioning of wireless devices and that involves the wireless communication network, e.g. nodes that may provide positioning methods corresponding to the conventional methods mentioned in the Background. In the shown example and in the case of 5G, the further network nodes may be core network node and may e.g. comprise a location server 117, e.g. a Location Management Function (LMF) node, a Core Access and Mobility Management Function (AMF) node 115 and a Gateway Mobile Location Centre (GMLC) node 116. In the case of LTE, the location server 117 would instead typically correspond to an Extended Serving Mobile Location Center (E-SMLC) node, the AMF node 115 would typically correspond to a Mobility Management Entity (MME) node and the GMLC node would typically be a GMLC node also in the case of LTE.

Positioning methods and function that may be supported by the wireless communication network 100 being a 5G network, and e.g. by the first wireless device 120, are for example indicated in 3GPP TS 38.455 "NR Positioning Protocol A (NRPPa) (Release 15)", V0.6.0 (2018-03). A corresponding protocol for LIE is e.g. described in 3GPP TS 36.455 "LIE Positioning Protocol A (LPPa) (Release 14)", V14.4.0 (2017-12).

Hence, the location server 117 and the radio network node 110 may be communicatively connected and communicate with each other via the NRPPa protocol in case of NR, i.e. 5G, which in case of LTE, i.e. 4G, would correspond to LPPa. In the shown example, at least the first wireless device 120 but possibly also the second wireless device 121, is communicatively connectable to the wireless communication network 100 via the radio network node 110 e.g. so that it may utilize positioning methods supported and/or provided by the wireless communication network 100. The radio network node 110 and the first wireless device 120 may communicate via the Radio Resource Control (RRC) protocol, e.g. as indicated in 3GPP TS 38.300 V15.1.0 (2018-03), chapter 7.

The communicative connection between the first wireless device 120 and the wireless communication network 100 may alternatively or additionally be directly with the location server 117 and e.g. based on an enhanced LPP for 5G that in the case of 5G thus may be a NRPP.

The AMF node 115 and the radio network node 110 may be connected to each other and e.g. communicate via an interface that for 5G may be named NG or N2 and that in LTE would correspond to the interface S1 between an MME node and an eNB. Further, the AMF node 115 and the GMLC node 116 may be connected to each other and e.g. communicate via a certain interface that for 5G may be named NGLg and that in LTE would correspond to the interface SLg between a MME node and a GMLC node.

Further, the first wireless device 120 and the second wireless device 121 are configured to so they may communicate wirelessly directly with each other, e.g. via a direct communication link 125, such as a so called side link, and in the shown example they are positioned so they are within reach for such direct communication with each other. The direct communication may e.g. be based on (LAN, Bluetooth, V2X and/or may be communication over side link as discussed for 5G. Moreover, although not shown in the figure, the radio network node 110 may provide radio coverage corresponding to one or more cells and/or may provide one or more radio beams for serving one or more wireless devices, e.g. the first wireless device 120 and the second wireless device 121. The radio beams may be associated with said cell.

The figure also shows a further node 130 and a further network 140. The further node 130 may be located outside the wireless communication network 100, i.e. be an external node, as indicated in the figure, or alternatively (not indicated in the figure) be comprised in the wireless communication network 100 and thus be a network node thereof, e.g. a management node thereof. The further network node 130 may in principle be any node communicatively connected to the radio network node 110.

Likewise, the further network 140 may be located outside the wireless communication network 100, i.e. be an external network, as indicated in the figure, e.g. corresponding to a so-called computer cloud, often simply referred to as cloud, that may provide and/or implement services and/or functions for and/or relating to the wireless communication network 100. The further network 140 may alternatively (not indicated in the figure) be comprised in the wireless communication network 100 and thus e.g. correspond to a subnetwork thereof. It is implied that a network and the further network 140 comprises interconnected network nodes and may e.g. include the further node 130 as indicated in the figure. The further network 140 may in principle be any network communicatively connected to the radio network node 110.

Attention is drawn to that FIG. 1 is only schematic and for exemplifying purpose and that not everything shown in the figure may be required for all embodiments herein, as should be evident to the skilled person. Also, a wireless communication network or networks that correspond(s) to the wireless communication network 100, will typically comprise several further network nodes, such as further radio network nodes, e.g. base stations, network nodes, e.g. both radio and core network nodes, etc., as realized by the skilled person, but which are not shown herein for the sake of simplifying.

Figure 2:
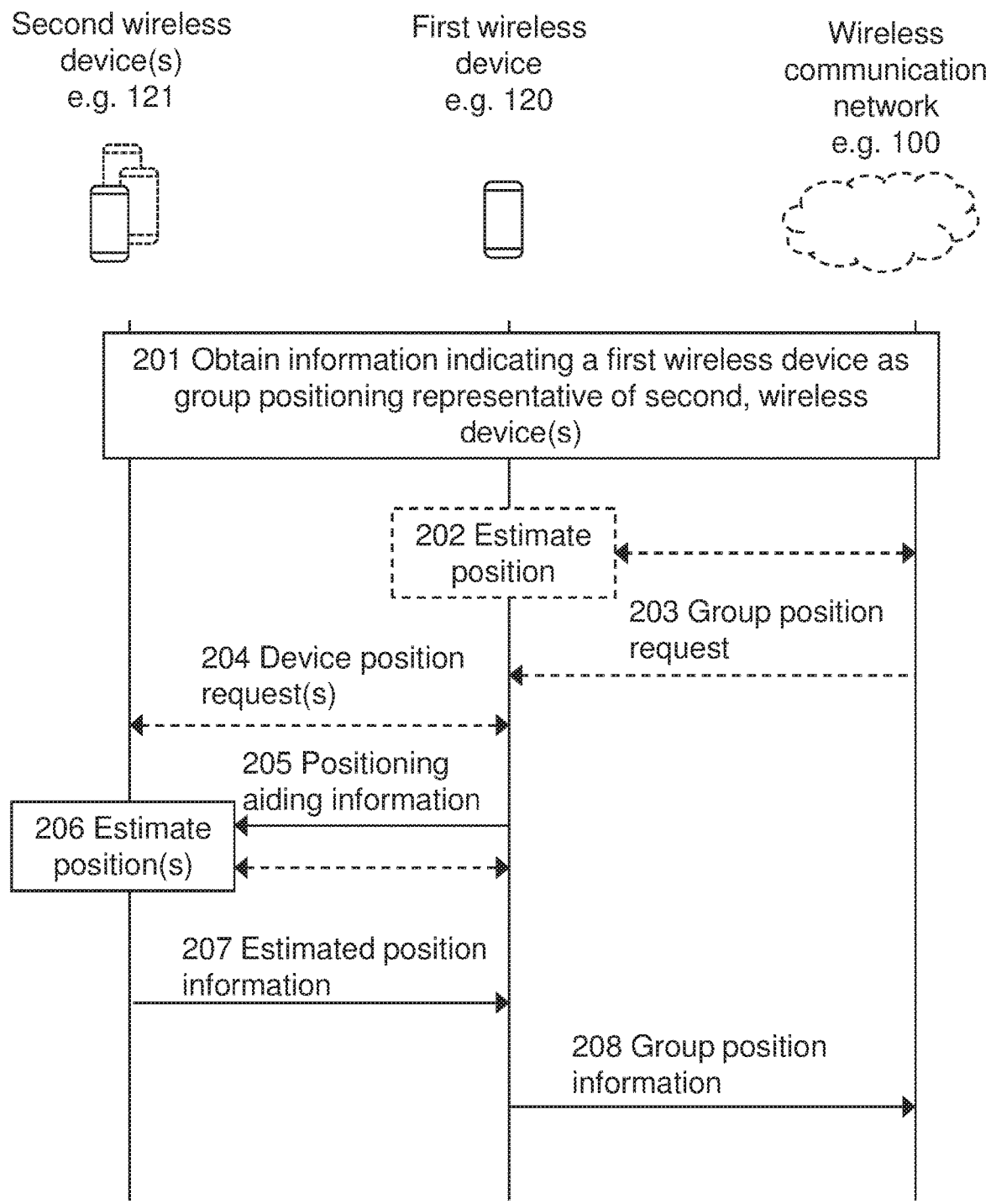
FIG. 2 is a combined signalling diagram and flowchart for describing and discussing examples and embodiments herein.

FIG. 2 is a combined signalling diagram and flowchart for describing and discussing some examples and embodiments herein relating to a method for managing position information associated with a group of wireless devices, including e.g. the first wireless device 120 and the second wireless device 121, configured to be served in a wireless communication network 100. Note that instead of one second wireless device 121 there may in some embodiments, and typically in practice, be more, i.e. multiple, second wireless devices that are part of the group. Further, although referred to as the wireless communication network 100 below, i.e. as a whole, it should be realized that it in practice are one or more nodes thereof that are involved, such as indicted in FIG. 1, and that communication with wireless devices, e.g. the first wireless device 120 is via a radio network node, e.g. the radio network node 110, of the network.

The actions below may be taken in any suitable order and/or be carried out fully or partly overlapping in time when this is possible and suitable.

Action 201

The wireless communication network 100, e.g. one or more modes thereof, and/or the first wireless device 120 and/or the second wireless device 121 obtains information indicating one wireless device, here the first wireless device 120, as member and positioning representative of the group, and at least one other, here the second, wireless device 121 as further member of the group. Said at least one second wireless device 121 is able to communicate directly with the first wireless device 120 over a direct communication link, e.g. the direct communication link 125, i.e. they are able to communicate directly with each other over said direct communication link.

As used herein, by position information regarding or associated with a device is meant information informing about a position of the device or at least information from which the position of the device can be derived.

As used herein, by devices communicating directly over a direct communication link, is meant that the communication is not via any intermediate node or device, e.g. via a base station, but instead directly between the devices over the direct communication link, e.g. over a so called side link.

Note that although the single box indicting the present action in the figure may give the impression that all three of the first wireless device 120, the second wireless device 121 and the wireless communication network 100 obtain the information at the same time in the present action that is only one simultaneous action, this is typically not the case in practice, as should be realized. The single action box spanning over all three entities is here only to simplify presentation.

Obtaining the information can be accomplished in many different ways. One example is provided and discussed separately below in connection with FIG. 3. This example is based on that the network obtains status information about wireless devices and determines the group and roles from that and then communicates this information to the wireless devices of the determined group. However, other alternatives are possible and are discussed below as well.

For example, in some embodiments it may not be needed that the second wireless device 121 in the present action obtains information in advance but may receive this information explicitly or implicitly from the first wireless device 120 in connection with a positioning request, such as in Action 204 discussed below.

As a further example, in some embodiments, the wireless communication network 100 may obtain the information the present action in connection with, e.g. together with, the group position information in Action 208 discussed below. This may be the case if the first and second wireless devices 120, 121 obtain the information in the present action prior to the wireless communication network 100, e.g. if the first wireless device 120 and second wireless device 121 are configured and able to form the group and/or determine the group position representative instead of, or without involvement by, the wireless communication network 100.

Action 202

The first wireless device 120 may estimate its own position, e.g. with support from the wireless communication network 100, such as by using any of the conventional and/or available positing methods that are provided and/or supported by the wireless communication network 100. The first wireless device 120 may alternatively or additionally also base its positioning estimation on other, non-network dependent, positioning capabilities available to it, e.g. via an internal or connected GPS receiver or the like.

The estimation may fully or partly be performed regularly and/or separate from what triggers execution of the method, or it may be part of what triggers performing of the method, e.g. that the wireless communication network 100 sends a request to the first wireless device 120 to perform the method and/or the estimation. Such request may be sent in response to and/or based on that the wireless communication network 100 has obtained the information in Action 201, e.g. in response to the wireless communication network 100 has determined the first wireless device 120 as the positioning representative.

Action 203

The wireless communication network 100 may send a group positioning request to the first wireless device 120, i.e. the positioning representative, which request requests the first wireless device 120 to provide group positioning information comprising information based on estimated position for one or more other group members, e.g. of the second wireless device 121. In other words, such request may be regarding all or selected one or more group members that have the first wireless device 120 as their positioning representative.

Action 204

The first wireless device 120, i.e. the positioning representative, may send device positing requests to one or more of the other group members, respectively. e.g. to the second wireless device 121. The device positioning request may be sent via the direct communication link 125, or direct communication links in case of further group members, i.e. in case of multiple second wireless communication devices since there typically will be one such link per device.

Action 205

The first wireless device 120, i.e. the positioning representative, may send, via the direct communication links(s), positioning aiding information to one or more of the other group members, respectively, e.g. to the second wireless device 121 via the direct communication link 125, which receive the positioning aiding information. The first wireless device 120 may preferably send the positioning aiding information by broadcasting it.

The positioning aiding information may be sent in response to that the second wireless device 121 has requested it, e.g. as part of that it is about to estimate its own position in Action 206 described below and/or in response to that the second wireless device 121 received the positioning request in Action 204 and has determined it want positioning aiding information to be able to, or to be able to better, estimate its own position. It may also be sent on request by the second wireless device 121 based on that the second wireless device 121 for some other reason has come to conclusion that it need the position aiding information.

Another possibility is that the device positioning request and the positioning aiding information are sent together, e.g. in the same message, and/or for example that receipt of the positing aiding information also has the meaning of requesting the position of the second wireless device 121.

The positioning aiding information may, at least partly, be based on the estimation in Action 202, i.e. on the first wireless device 120 estimation of its own position. Said positioning aiding information may comprise one or more of:

an estimated position of the first wireless device 120,
a velocity of the first wireless device 120,
information on direction of a radio beam serving the first wireless device 120,
an indication of a method used for estimating the estimated position of the first wireless device 120,
an indication of a direction of movement of the first wireless device 120, and
one or more time indications associated with the positioning aiding information.

The positioning aiding information may also comprise further information, such as information on an uncertainty associated with the positing aiding information, e.g. the estimated position of the first wireless device 120.

Said estimated position of the first wireless device 120 may correspond to the position estimated in action 202.

Said information on direction of the radio beam may be angular information, e.g. an angle specifying directivity of the radio beam.

The indication of a direction of movement may e.g. be a path bearing, such as a direction of the path that the positioning representative, here the first wireless device 120, is moving along. The indication of the direction of movement is typically relative to a reference, such as north. The indication of the direction of movement may be obtained from e.g. an inertial sensor, such as accelerometer, gyro, and/or compass, associated with, e.g. comprised in, the first wireless device 120, and/or from computations by the first wireless device 120 based on difference(s) between two or more positioning estimates separated in time.

As should be realized, said one or more time indications associated with the positioning aiding information are indications of when in time the content of the positioning aiding information was obtained e.g. the position of the first wireless device was estimated, direction of the radio beam was obtained, etc.

Action 206

The second wireless device 121 may estimate its position i.e. the position of said second wireless device 121, e.g. based on said positioning aiding information, i.e. as received in Action 205.

Said estimated position of the second wireless device 121 may additionally or alternatively be based on ranging estimation and/or direction estimation performed between the first wireless device 120 and the second wireless device 121 over said direct communication link 125, e.g. side link. As should be recognized by the skilled person this typically involves exchange of information, such as messages and/or reference signals, over the direct communication link 125, that also includes exchange of timing information regarding time of arrival of said messages and/or reference signals and taking into account any relevant processing time that have been involved.

Exchange of information for the ranging estimation and/or direction estimation as well as the sending and receiving of positioning aiding information in Action 205, are examples of communication of positioning supporting information over the direct communication link 125.

Moreover, the estimated position of said second wireless device 121 may be a relative position and may be estimated in relation to a position of the first wireless device 120. In some situations, it may suffice the estimated position is relative, e.g. when it suffice that the second wireless device 121 gets informed about its own position in relation to the first wireless device 120 or it is of less importance that the second wireless device 120 is informed about its own position. The first wireless device and/or the wireless communication network 100 may receive information on the estimated position from the second wireless device 121, as will be described below, and use this information to determine, e.g. compute, a more accurate and/or absolute position of the second wireless device 121. The wireless communication network 100 may thus still gain knowledge about the position of the second wireless device 120 and without having to directly communicate with the second wireless device 121 for positing reasons at least.

In other embodiments the estimated position of said second wireless device 121 may be an absolute position, e.g. based on said positioning aiding information and/or the ranging estimation that may be performed by both the first wireless device 120 and the second wireless device 121. The ranging estimation at the second wireless device 121 may e.g. either be based on the time of arrival estimation of a signal received from the first wireless device 120 and/or an angle of arrival estimation of a signal received from the first wireless device 120 and/or a mapping of received signal power to distance, which together with the absolute position of the first wireless device 120, e.g. as provided by the positioning aiding information, supports estimation of the absolute position of the second wireless device 121.

Action 207

The second wireless device 121 may then send, to said first wireless device 120 over said direct communication link 125, estimated position information that thus may be received by the first wireless device 121. The estimated position information comprises the estimated position of said at least one second wireless device 121, i.e. as estimated in Action 206.

The estimated position information may also comprise further supplementing information, such a time reference associated with the estimation in Action 206 and identifier of and/or measured information on a radio beam received by the second wireless device 121 at said time, which can be used by the first wireless device and/or later used by the wireless communication network 100 to determine, e.g. compute, an improved, such as more accurate and/or absolute, position of the second wireless device 121.

The first wireless device 120 may receive estimated position information also from further wireless devices of the group for which the first wireless device 120 acts as positioning representative.

In some embodiments the first wireless device 120 may use the estimated position information from the second wireless device 121 and e.g. information regarding its own, i.e. the first wireless device 121 estimated position, to determine, e.g. compute, an improved, such as an absolute and/or more accurate position, of the second wireless device 121.

Action 208

The first wireless device 121 may send, to the wireless communication network 100 that may receive, group position information being position information associated with the group and relating to at least the estimated position of the second wireless device 121. The group position information may e.g. comprise the estimated position information received in Action 207.

In some embodiments, the wireless communication network may use the estimated position information, i.e. the estimated position and any further supplementing information, to determine, e.g. compute, an improved, such as an absolute and/or more accurate position, of the second wireless device 121.

Hence, as understood from the above and thanks to embodiment herein, network assisted positioning needs only be provided to the first wireless device 120 acting as positioning representative and is not needed to be provided to the rest of the group, i.e. in the example here the second wireless device 121 but in practice typically multiple second wireless devices. Still they may benefit from network assisted positioning and/or positioning capabilities of the first wireless device 120 via the positioning aiding information over the direct communication link 125. Further, the wireless communication network 100 may still be informed about the estimated position of the second wireless device 121 since information on this can be sent to the first wireless device 120 over the direct communication link 125 via the first wireless device to the wireless communication network 100. The wireless network 100 may thanks to this still be able to get information about the position of the second wireless device 121.

It is realized that the above enables offloading the network, improves spectrum utilization, reduces the need of implementing overhead to be able to support large numbers of wireless devices with network positioning etc. Further, wireless devices that themselves are less capable of positioning may even be able to provide improved estimation of their own position thanks to that they may benefit from the positioning capabilities of the first wireless communication device.

In other words, embodiments herein provide improvements regarding positioning in wireless communication networks.

Figure 3:
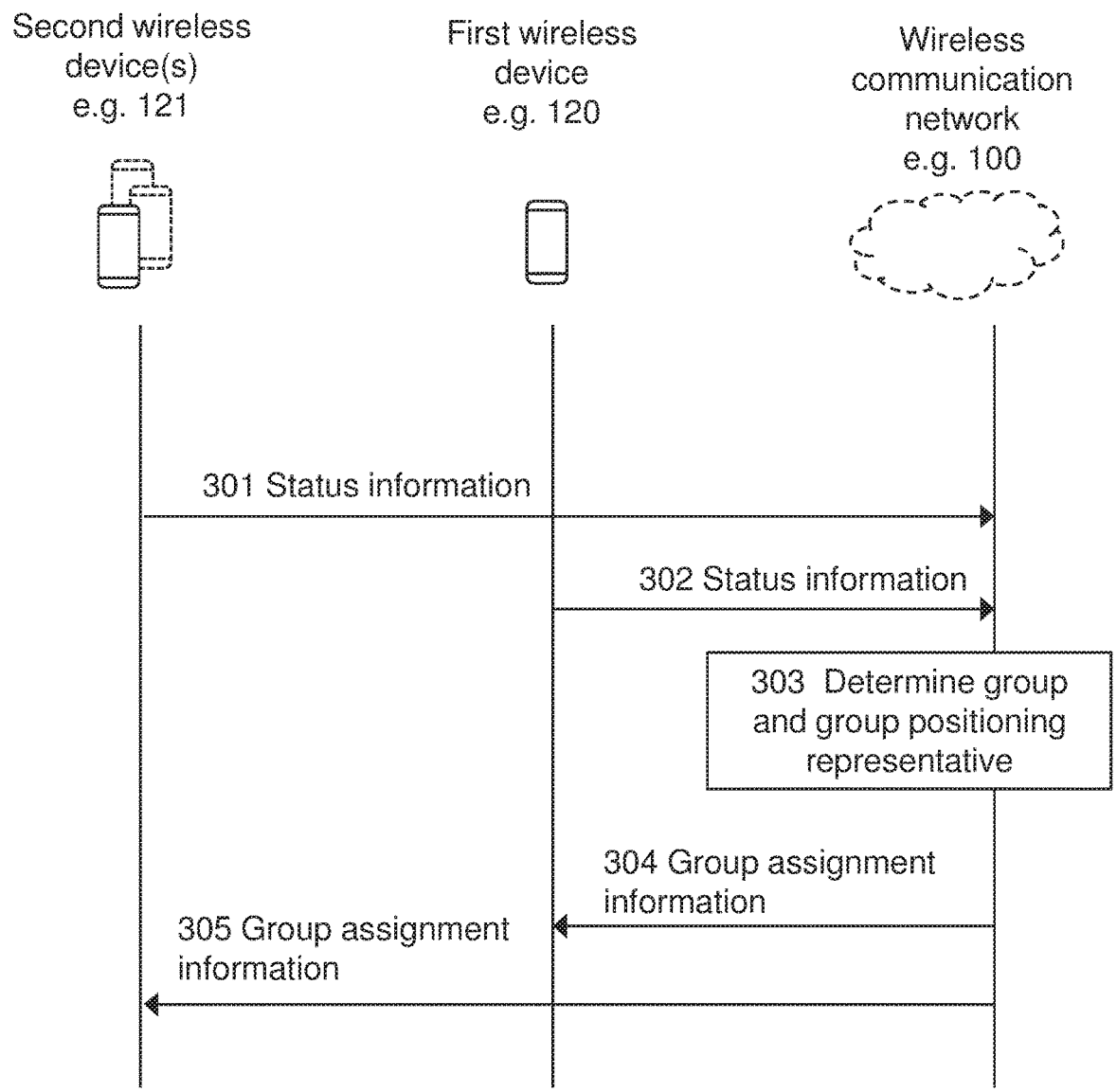
FIG. 3 is yet another combined signalling diagram and flowchart for exemplifying and discussing how certain information may be obtained in embodiments herein.

FIG. 3 is yet another combined signalling diagram and flowchart for exemplifying and discussing how the wireless communication network 100, e.g. one or more modes thereof, and/or the first wireless device 120 and/or the second wireless device 121 may obtain the information indicating one wireless device, here the first wireless device 120, as member and positioning representative of the group, and at least one other, here the second, wireless device 121 as further members of the group. What is discussed here may thus fully or partly correspond to Action 201 above.

Actions 301, 302

Wireless devices, here the first wireless device 120 and the second wireless device 121, may send status information to the wireless communication network 100 that receives the status information. The status information may for each device comprise one or more indications on the following:

a position associated with the device, an identifier, e.g. beam id, of a radio beam serving the device, a time duration for remaining in the group, i.e. that the device will or may be able to remain in the group, one or more operative positioning capabilities of the device, and a positioning capability and/or positioning accuracy provided by the device, e.g. a Global Navigation Satellite System (GNSS) subscription level.

The status information associated with the devices, respectively, are typically but need not comprise the information of the same type. For example, devices without GNSS support need not report subscription level but those who support it may include it, etc.

In the status information, the position associated with the device may be a position of the device determined by the device itself, e.g. by means of GNSS, such as an internal GPS receiver, and/or by means of positioning assisted by the wireless communication network 100 and/or by means of positioning that is assisted by one or more other wireless devices that the network is directly communicating with. Further, the position may be relative, e.g. relative one or more other wireless devices, e.g. that the device is within a certain distance and/or direction from these device(s). This may be implicit, e.g. following by that the device is able to directly communicate with another wireless device over a direct communication link and therefore is within a certain distance from it.

The status information may be received by one or more radio network nodes of the wireless communication network, e.g. the radio network node 110, although different receiving radio network nodes for different devices also are possible. The status information may then be internally routed to suitable one or more other nodes of the wireless communication network 100 for processing such as in the next action, or the processing may take part in the radio network node 110. The one or more suitable nodes may e.g. include the location server 117, the AMF node 115, the GMLC node 116, the further node 130 and the further network 140.

Action 303

The wireless communication network 100, e.g. said suitable one or more nodes thereof, may determine one wireless device as the positioning representative, here the first wireless device 120, based on the obtained status information.

The determination of the first wireless device 120 as the positioning representative may further be based on that the first device fulfills one or more of the following criteria:

it has a certain location in the group,
it is associated with a certain, e.g. longest, time to remain in group,
it is associated with a certain operative positioning capability and/or positioning accuracy.

Said certain operative positioning capability may correspond such capability considered best in the group according to a ranking, e.g. predetermined, of different such capabilities that devices can have. It can be related to an accuracy and/or service level, a certain such as highest GNSS subscription level in the group.

For example, the first wireless device 120 may be determined as the positioning representative since it provides the best positioning accuracy, e.g. since it has the highest GNSS subscription level, while it at the same time has a sufficient battery level that indicates it will be able to remain in the group and act as positing representative for at least a certain period of time. Some of the other wireless devices of the group, e.g. the second wireless device 121 may have provided status information with its position indicated relative to the first wireless device, e.g. that it is located a certain distance from it, which directly may indicate that the first wireless device may be suitable as positioning representative.

The determination may also comprise determining which other wireless devices that shall be part of the group, i.e. here also determining that the second witless device 121 is part of the group, based on the obtained status information. Note that not all wireless devices that the wireless communication network 100 have received status information from, need to be determined to be part of the group although in some embodiments the group members may be predetermined, and the present action may then only about determining the positioning representative of the group. In such embodiments, it may be explicit or implicit from the status information which wireless devices are part of the group.

Which wireless communication devices to be part of the group and how this can be determined is further discussed separately below.

Action 304

The wireless communication network 100 may send, in response to the determination in Action 303, group assignment information to at least the first wireless device 120, which information informs the first wireless device 120 that it is the positioning representative.

The information may also inform about the one or more other wireless devices, here the second wireless device 121, of the group, i.e. the wireless devices(s) for which the first wireless device 120 is acting as positing representative. However, note that in some embodiments, e.g. when the group members are predetermined and/or the first wireless communication device 120 already has knowledge about the group members, it may suffice that the group assignment information informs the first wireless device 120 that it is the positioning representative.

The present action may thus exemplify, and may fully or partly correspond to, Action 201 above for the wireless communication network 100.

Action 305

The wireless communication network 100 may send, in response to the determination in Action 303, group assignment information to also the one or more other wireless communication devices of the group, e.g. the second wireless device 121, which information informs these devise that the first wireless device 120 is their positioning representative and/or that they are members of said group.

In some embodiment the group assignment information in the present action may inform about the same things as in action 304.

In some embodiments, e.g. when the group members are predetermined and/or where the first wireless device 120 itself informs the other wireless devices of the group, e.g. the second wireless device 121, the present action may not be needed.

The present action may thus exemplify, and may fully or partly correspond to, Action 201 above for the second wireless device 122.

Figure 4:
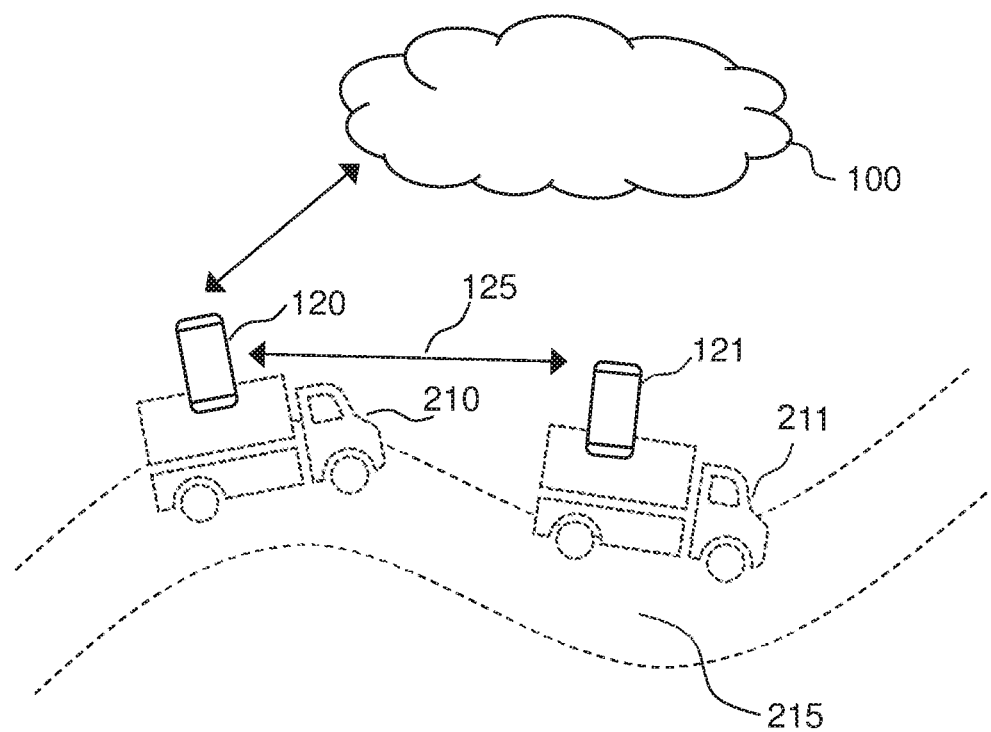
FIG. 4 schematically illustrates a situation where group positioning according to embodiments herein may be used.

FIG. 4 schematically illustrates a situation where group positioning according to embodiments herein may be used.

The first wireless device 120 and the second wireless device 121 may be associated with, e.g. physically co-located with or located in, or even integrated, in vehicles, such as trucks or similar, as the figure attempts to schematically illustrate. The vehicles may e.g. be fully or partly supporting autonomous driving. Through the association, the wireless devices will be associated with, or at least partly exhibit, the same movement pattern as the vehicles. The movement patterns in a group of such wireless devices may thus be the same or at least be correlated with each other within certain limits, and the vehicles may be formed for platooning and/or even already be formed in a platoon, as mentioned in the Background.

From status information of the wireless devices, such as discussed above in connection with FIG. 3, the wireless communication network 100 may receive information and from this information and/or additional information, e.g. that the wireless devices 120, 121 both are part of a predetermined group for platooning, the wireless communication network 100 may be informed that the first and second wireless devices 120-121 shall form a group. In some embodiments, the wireless communication network 100 may have or obtain knowledge about movement patterns associated with individual wireless devices or a group of wireless devices at a certain location and may from this knowledge find support and/or correlations that some wireless devices are or will at least likely be moving together and thus share a movement pattern. The wireless communication network 100 may then, based on this, come to conclusion and/or determine that some wireless devices, e.g. the first wireless device 120 and the second wireless device 121, may or shall form a group. This could e.g. be the case for wireless devices onboard a train and/or belonging to car commuters that at least for some period will have a common movement pattern, e.g. due to traffic circumstances. In the shown example, the movement pattern may correspond to how the vehicles drive or will drive on roads together according to a predefined route, e.g. as a platoon.

When such a group is known, the wireless communication network 100 may determine or select one of the devices to be the positioning representative of the group, in the shown example, the first wireless device 120. In the shown example, the rear vehicle was determined or selected to act as positioning representative, which in some embodiments thus may correspond to a platoon leader. In other embodiments, the wireless device of the first or leading vehicle may instead be the positioning representative that may correspond to the platoon leader. In yet some embodiments, with three or more wireless devices in the group, it may instead be a vehicle between other wireless devices of the group, that is selected to act as positioning representative. Such selection may be based on that a wireless device in the middle may have the only and/or best coverage via direct communication link, e.g. side link, to the other wireless devices of the group.

Hence, said first and second wireless devices 120, 121 may further be associated with a certain movement or mobility pattern that may be predefined and/or predetermined, i.e. it may be known or assumed that said devices will or likely will move accord to this pattern. The pattern may e.g. correspond to a transport route between two geographical locations and may e.g. be along known paths for transportation, e.g. roads and/or railway. The group may be formed based on devices that are associated with the same movement pattern and e.g. shall form a platoon.

Further, said first and second wireless devices may such positioned within a certain distance from each other. The distance should be close enough to allow for said direct communication. It may e.g. be predetermined, such as known in advance, that as devices are and/or will and/or will likely stay within a certain distance and that this distance allows for said direct communication. This may e.g. be the case for wireless devices located on a train or part of a caravan of vehicles, e.g. for platooning, or wireless device carried by persons walking and moving in group during movement according to said movement pattern. The group may alternatively or additionally be formed based on devices that are positioned within said certain distance from each other, i.e. so they can, and/or as long as they can, communicate directly with each other and/or with the positioning representative of the group.

Said group may thus correspond to a so called platoon and the positioning representative may correspond to a so called platoon leader.

Said certain location may e.g. correspond to that it is located first in a movement direction of the group, e.g. based om said movement pattern, and/or that it is located in such position, e.g. central in the group, to facilitate communication through said direct communication link 125 and possibly also corresponding further such links with the rest of the group.

Said longest time to remain in the group may e.g. be based on battery capacity and/or expected energy consumption and/or predetermined knowledge about destination and/or said movement pattern, e.g. a route.

Figure 5:
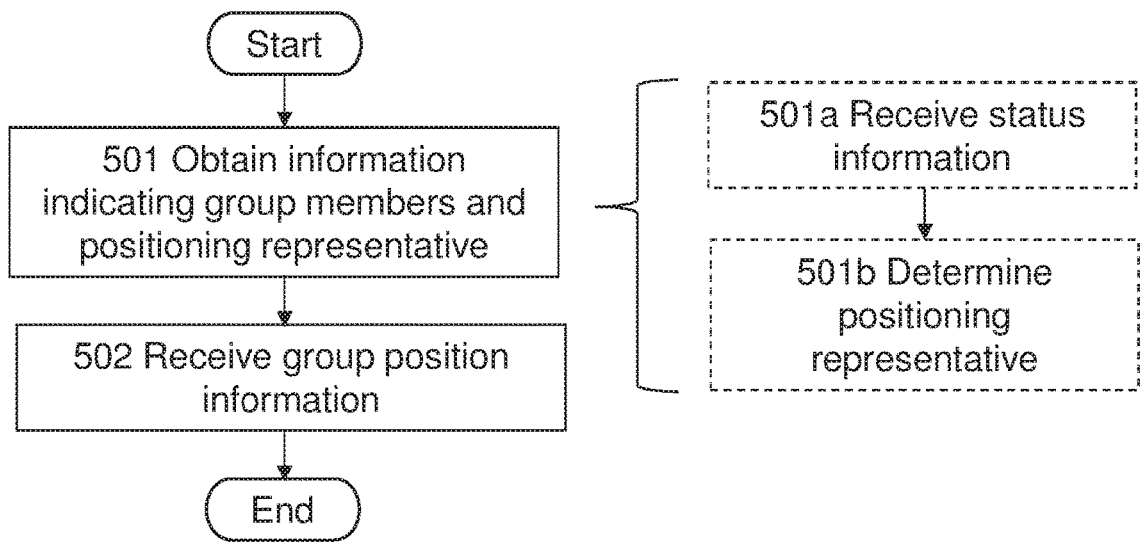
FIG. 5 is a flowchart schematically illustrating embodiments of a method performed by one or more nodes.

FIG. 5 is a flowchart schematically illustrating embodiments of a method performed by a wireless communication network, e.g. the wireless communication network 100, or in practice typically by one or more nodes relating to and/or that are comprised in the wireless communication network 100. The one or more nodes may e.g. comprise one or more of the radio network node 110, the location server 117, AMF node 115, the GMC node 116, the further node 130 and/or the further network 140. The method is for managing position information associated with a group of wireless devices, e.g. the first wireless device 120 and the second wireless device 121, configured to be served in the wireless communication network.

For readability reasons, the wireless communication network 100 will in the following be referred to as performing the method and actions thereof, but may thus, in view of the above, in the text be replaced by one or more nodes relating to the wireless communication network 100.

The method comprises the following actions.

Action 501, Actions 501*a-b*

The wireless communication network 100 obtains information indicating a first wireless device, e.g. the wireless device 120, as member and positioning representative of the group and at least one other, second, wireless device, e.g. the wireless device 121, as further member of the group. Said at least one second wireless device 121 being able to communicate wirelessly and directly with the first wireless device 120 over a direct communication link, e.g. the direct communication link 125.

In some embodiments, to obtain said information comprises that:

The wireless communication network 100 receives, from said first wireless device 120 and at least one second wireless device 121, status information that per device comprises one or more indications on the following: a position associated with the device, an identifier of a radio beam serving the device, a time duration for remaining in the group, one or more operative positioning capabilities of the device, an operative positioning capability of the device, and/or a positioning accuracy provided by the device.

The wireless communication network 100 determines the first wireless device 120 as the positioning representative based on the obtained status information.

The determination of the first wireless device 120 as the positioning representative may further be based on that the first wireless device 120 fulfills one or more of the following criteria: it has a certain location in the group, it is associated with a certain time to remain in group, it is associated with a certain operative positioning capability and/or operative positioning accuracy.

This action may fully or partly correspond to Action 201 and Actions 301-303.

Action 502

The wireless communication network 100 receives, from the first wireless device 120, group position information being position information associated with the group and relating to at least an estimated position of said at least one second wireless device 121. The estimated position being based on communication of positioning supporting information over said direct communication link 125.

Said communication of positioning supporting information may comprise positioning aiding information received by said at least one second wireless device 121 from the first wireless device 120 over said direct communication link 125.

Furthermore, said positioning aiding information may comprise one or more of the following:
an estimated position of the first wireless device 120,
a velocity of the first wireless device 120,
information on direction of a radio beam serving the first wireless device 120, and
an indication of a direction of movement of the first wireless device 120.

In some embodiments, said communication of positioning supporting information over said direct communication link 125 relates at least partly to ranging estimation performed between the first wireless device 120 and said at least one second wireless device 121 over said direct communication link 125.

Moreover, in some embodiments, said estimated position of said at least one second wireless device 121 is estimated in relation to a position of the first wireless device 120.

This action may fully or partly correspond to Action 208.

Figure 6:
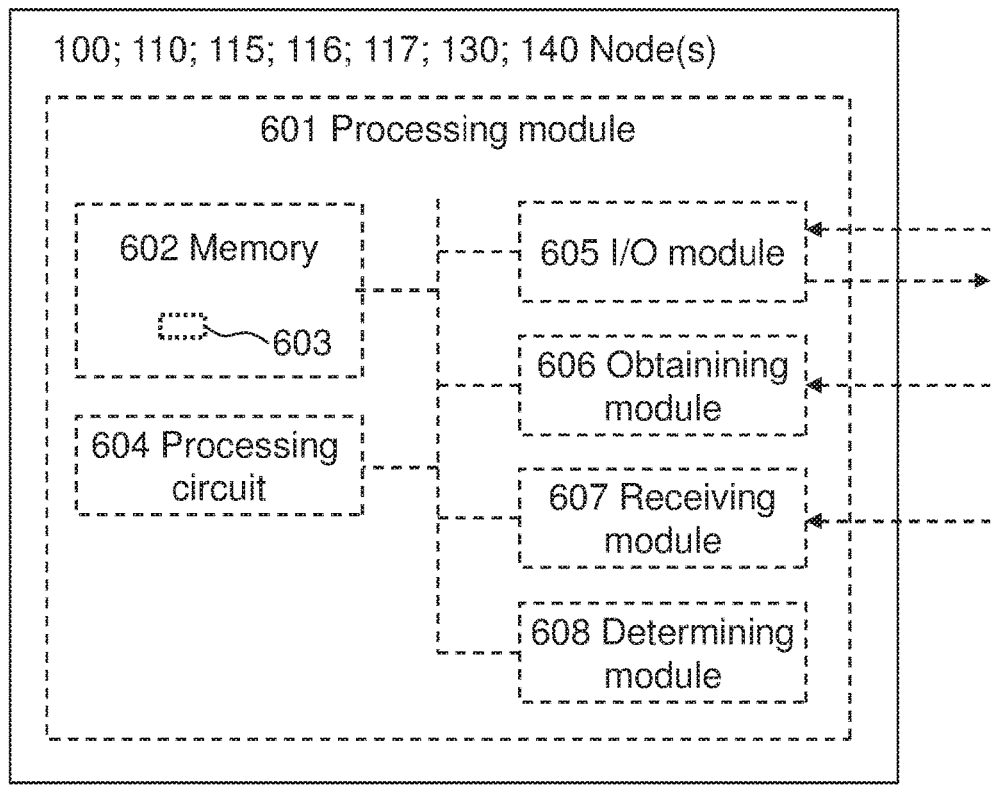
FIG. 6 is a functional block diagram for illustrating embodiments of said one or more nodes.

FIG. 6 is a schematic block diagram for illustrating embodiments of one or more nodes, e.g. one or more of the radio network node 110, the location server 117, AMF node 115, the GMLC node 116, the further node 130 and/or the further network 140, for managing position information associated with a group of wireless devices, e.g. the first wireless device 120 and the second wireless device 121, configured to be served in a wireless communication network, e.g. the wireless communication network 100. The figure is particularly for illustrating how the said one or more nodes, and thereby the wireless communication network 100, may be configured to perform the method and actions discussed above in connection with FIG. 5.

Said one or more nodes may comprise a processing module 601, such as a means, one or more hardware modules, including e.g. one or more processors, and/or one or more software modules for performing said method and/or actions.

Said one or more nodes may further comprise a memory 602, such as in the form of one or more hardware memory modules, that may comprise, such as contain or store, one or more computer programs 603. The one or more computer programs 603 comprise 'instructions' or 'code' directly or indirectly executable by said one or more nodes so they perform said method and/or actions. The memory 602 may comprise one or more memory units and may be further be arranged to store data, such as configurations and/or applications involved in or for performing functions and actions of embodiments herein.

Moreover, said one or more nodes may comprise a processing circuit 604 as exemplifying one or more hardware modules and may comprise or correspond to one or more processors. In some embodiments, the processing module 601 may comprise, e.g. 'is embodied in the form of' or 'realized by' the processing circuit 604. In these embodiments, the memory 602 may comprise said one or more computer programs 603 executable by the processing circuit 604, whereby said one or more nodes are operative, or configured, to perform said method and/or actions.

Typically, said one or more nodes comprise an Input/Output (I/O) module 605, configured to be involved in, e.g. by performing, any communication to and/or from other units and/or nodes. The I/O module 605 may be exemplified by an obtaining, e.g. receiving, module and/or a providing, e.g. sending or transmitting, module, when applicable.

In further embodiments, said one or more nodes, e.g. the processing module 601, may comprise an obtaining module 606, a receiving module 607 and/or a determining module 608, as exemplifying hardware and/or software module(s).

Therefore, according to the various embodiments described above, said one or more nodes, and/or the processing module 601 and/or the processing circuit 604 and/or the I/O module 605 and/or the obtaining module 606, are operative, or configured, to obtain said information indicating the first wireless device 120 as member and positioning representative of the group and said at least one other, second, wireless device 121 as further member of the group.

Moreover, according to the various embodiments described above, said one or more nodes, and/or the processing module 601 and/or the processing circuit 604 and/or the I/O module 605 and/or the receiving module 607, are operative, or configured, to receive, from the first wireless device 120, said group position information.

According to some of the various embodiments described above, said one or more nodes, and/or the processing module 601 and/or the processing circuit 604 and/or the I/O module 605 and/or the obtaining module 606 and/or the receiving module 607 and/or the determining module 608, are operative, or configured, to receive from said first wireless device 120 and the at least one second wireless device 121, said status information, and operative, or configured, to determine the first wireless device 120 as the positioning representative based on the received status information.

Figure 7:
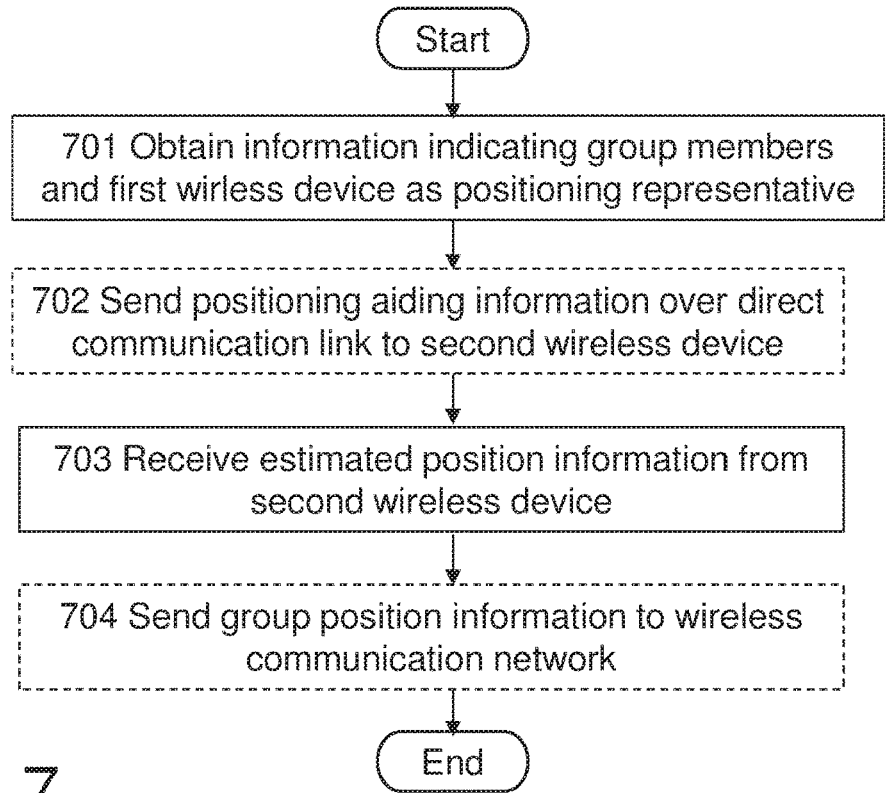
FIG. 7 is a flowchart schematically illustrating embodiments of a method performed by a first wireless device.

FIG. 7 is a flowchart schematically illustrating embodiments of a method performed by a first wireless device, e.g. the first wireless device 120, for managing position information associated with a group of wireless devices, e.g. the first wireless device 120 and the second wireless device 121, configured to be served in a wireless communication network, e.g. the wireless communication network 100. The method comprises the following actions.

Action 701

The first wireless device 120 obtains information indicating the first wireless device 120 as member and positioning representative of the group and at least one other, second, wireless device, e.g. the wireless device 121, as further member of the group. Said at least one second wireless device 121 being able to communicate wirelessly and directly with the first wireless device 120 over a direct communication link, e.g. the direct communication link 125.

This action may fully or partly correspond to Action 201 and Action 304.

Action 702

The first wireless device 120 may send, based on the obtained information, to said at least one second wireless device 121, positioning aiding information over said direct communication link 125. This is an example of communication of positioning supporting information over the direct communication link 125.

Furthermore, said positioning aiding information may comprise one or more of the following:
an estimated position of the first wireless device 120, a velocity of the first wireless device 120, information on direction of a radio beam serving the first wireless device 120, and an indication of a direction of movement of the first wireless device 120.

This action may fully or partly correspond to Action 205.

Action 703

The first wireless device 120 receives, from said at least one second wireless device 121 over said direct communication link 125, estimated position information comprising an estimated position of said at least one second wireless device 121 that is based on communication of positioning supporting information over said direct communication link 125, e.g. based on the positioning aiding information sent in Action 702.

In some embodiments, said communication of positioning supporting information over said direct communication link 125 relates at least partly to ranging estimation performed between the first wireless device 120 and said at least one second wireless device 121 over said direct communication link 125.

Moreover, in some embodiments, said estimated position of said at least one second wireless device 121 is estimated in relation to a position of the first wireless device 120.

This action may fully or partly correspond to Action 207.

Action 704

The first wireless device 120 sends, to the wireless communication network 100, group position information being position information associated with the group and that is based on said received estimated position information.

This action may fully or partly correspond to Action 208.

Figure 8:
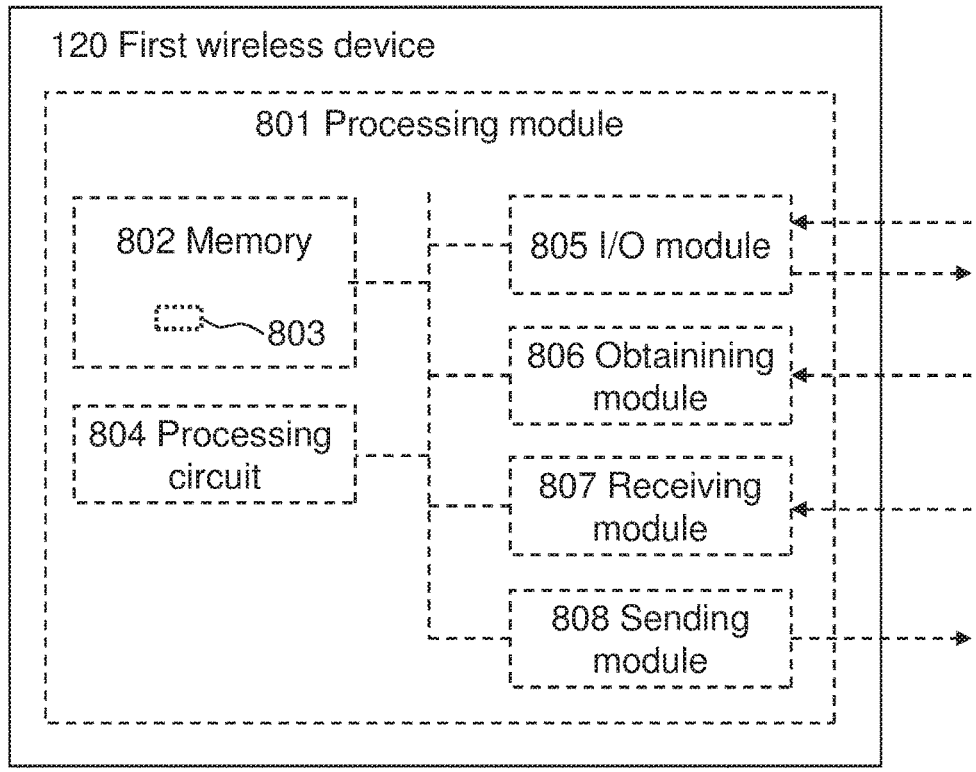
FIG. 8 is a functional block diagram for illustrating embodiments of said first wireless device.

FIG. 8 is a schematic block diagram for illustrating embodiments of a first wireless device, e.g. the first wireless device 120, for managing position information associated with a group of wireless devices, e.g. the first wireless device 120 and the second wireless device 121, configured to be served in a wireless communication network, e.g. the wireless communication network 100. The figure is particularly for illustrating how said first wireless device may be configured to perform the method and actions discussed above in connection with FIG. 7.

The first wireless device 120 may comprise a processing module 801, such as a means, one or more hardware modules, including e.g. one or more processors, and/or one or more software modules for performing said method and/or actions.

The first wireless device 120 may further comprise a memory 802, such as in the form of one or more hardware memory modules, that may comprise, such as contain or store, a computer program 803. The computer program 803 comprise 'instructions' or 'code' directly or indirectly executable by the first wireless device 120 so it performs said method and/or actions. The memory 802 may comprise one or more memory units and may be further be arranged to store data, such as configurations and/or applications involved in or for performing functions and actions of embodiments herein.

Moreover, said the first wireless device 120 may comprise a processing circuit 804 as exemplifying one or more hardware module and may comprise or correspond to one or more processors. In some embodiments, the processing module 801 may comprise, e.g. 'is embodied in the form of' or 'realized by' the processing circuit 804. In these embodiments, the memory 802 may comprise the computer program 803 executable by the processing circuit 804, whereby the first wireless device 120 is operative, or configured, to perform said method and/or actions.

Typically, the first wireless device 120 comprises an Input/Output (I/O) module 805, configured to be involved in, e.g. by performing, any communication to and/or from other units and/or nodes. The I/O module 805 may be exemplified by an obtaining, e.g. receiving, module and/or a providing, e.g. sending or transmitting, module, when applicable.

In further embodiments, the first wireless device 120, e.g. the processing module 801, may comprise an obtaining module 806, a receiving module 807 and/or a sending module 808, as exemplifying hardware and/or software module(s).

Therefore, according to the various embodiments described above, the first wireless device 120, and/or the processing module 801 and/or the processing circuit 804 and/or the I/O module 805 and/or the obtaining module 806, are operative, or configured, to obtain said information indicating the first wireless device 120 as member and positioning representative of the group and said at least one other, second, wireless device 121 as further member of the group.

Moreover, according to the various embodiments described above, the first wireless device 120, and/or the processing module 801 and/or the processing circuit 804 and/or the I/O module 805 and/or the receiving module 807, are operative, or configured, to receive, from the at least one second wireless device 121 over said direct communication link 125, said estimated position information.

According to some of the various embodiments described above, the first wireless device 120, and/or the processing module 801 and/or the processing circuit 804 and/or the I/O module 805 and/or the sending module 808 are, for said communication of positioning supporting information, operative, or configured, to send, based on the obtained information, to said at least one second wireless device 121, the positioning aiding information over said direct communication link 125.

Further, according to some of the various embodiments described above, the first wireless device 120, and/or the processing module 801 and/or the processing circuit 804 and/or the I/O module 805 and/or the sending module 808 are operative, or configured, to send, to the wireless communication network 100, said group position information.

Figure 9:
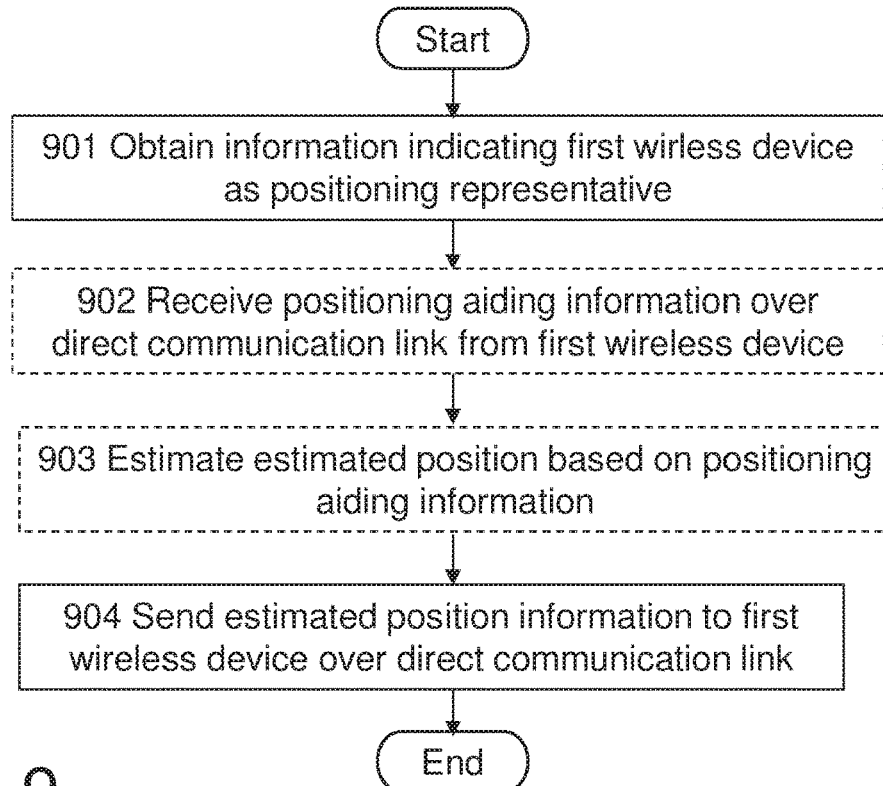
FIG. 9 is a flowchart schematically illustrating embodiments of a method performed by a second wireless device.

FIG. 9 is a flowchart schematically illustrating embodiments of a method performed by a second wireless device, e.g. the second wireless device 121, for managing position information associated with a group of wireless devices, e.g. the first wireless device 120 and the second wireless device 121, configured to be served in a wireless communication network, e.g. the wireless communication network 100.

The method comprises the following actions.

Action 901

The second wireless device 121 obtains information indicating the first wireless device 120 as member and positioning representative of the group and indicating the second wireless device 121 as further member of the group. Said at least one second wireless device 121 being able to communicate wirelessly and directly with the first wireless device 120 over a direct communication link, e.g. the direct communication link 125.

This action may fully or partly correspond to Action 201 and Action 305.

Action 902

The second wireless device 121 may receive, from said first wireless device 120, positioning aiding information over said direct communication link 125. This is an example of communication of positioning supporting information over the direct communication link 125.

Furthermore, said positioning aiding information may comprise one or more of the following:
an estimated position of the first wireless device 120,
a velocity of the first wireless device 120,
information on direction of a radio beam serving the first wireless device 120, and
an indication of a direction of movement of the first wireless device 120.

This action may fully or partly correspond to Action 205.

Action 903

The second wireless device 120 may estimate a position, i.e. an estimated position, of said second wireless device 121 based on said communication of positioning supporting information over said direct communication link 125.

This action may fully or partly correspond to Action 206.

Action 904

The second wireless device 120 sends, to said first wireless device 120 over said direct communication link 125, estimated position information comprising said estimated position of said at least one second wireless device 121 that is based on communication of positioning supporting information over said direct communication link 125, e.g. based on the positioning aiding information received in Action 902.

In some embodiments, said communication of positioning supporting information over said direct communication link 125 relates at least partly to ranging estimation performed between the first wireless device 120 and said at least one second wireless device 121 over said direct communication link 125.

Moreover, in some embodiments, said estimated position of said at least one second wireless device 121 is estimated in relation to a position of the first wireless device 120.

This action may fully or partly correspond to Action 207.

Figure 10:
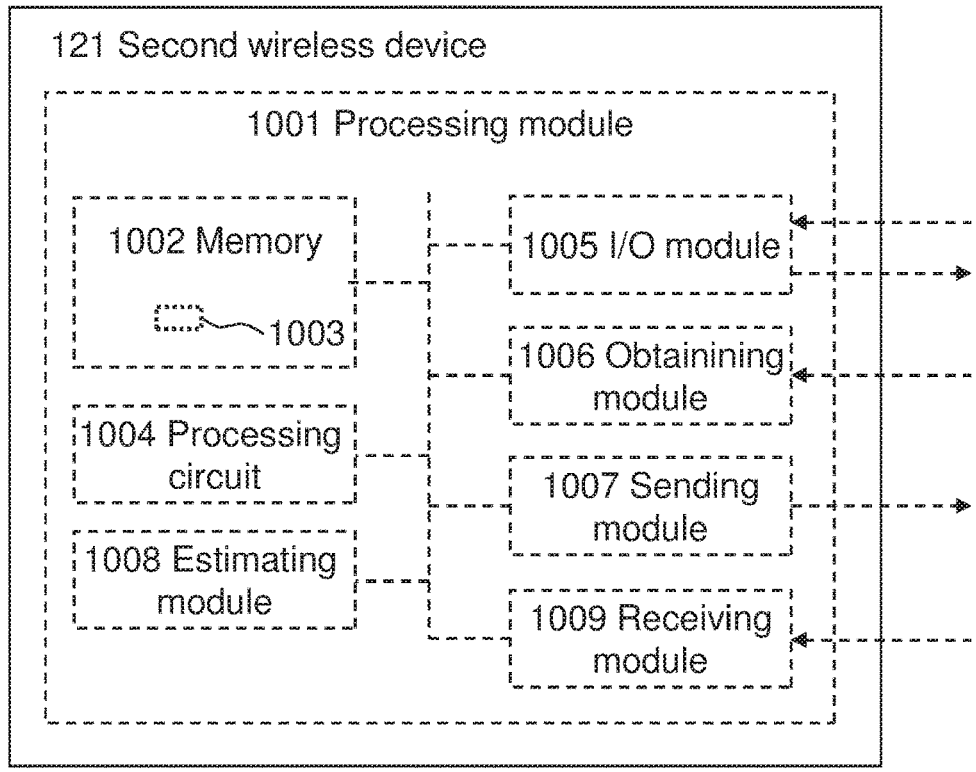
FIG. 10 is a functional block diagram for illustrating embodiments of said second wireless device.

FIG. 10 is a schematic block diagram for illustrating embodiments of a second wireless device, e.g. the second wireless device 121, for managing position information associated with a group of wireless devices, e.g. the first wireless device 120 and the second wireless device 121, configured to be served in a wireless communication network, e.g. the wireless communication network 100. The figure is particularly for illustrating how said first wireless device may be configured to perform the method and actions discussed above in connection with FIG. 9.

The second wireless device 121 may comprise a processing module 1001, such as a means, one or more hardware modules, including e.g. one or more processors, and/or one or more software modules for performing said method and/or actions.

The second wireless device 121 may further comprise a memory 1002, such as in the form of one or more hardware memory modules, that may comprise, such as contain or store, a computer program 1003. The computer program 1003 comprise 'instructions' or 'code' directly or indirectly executable by the second wireless device 121 so it performs said method and/or actions. The memory 1002 may comprise one or more memory units and may be further be arranged to store data, such as configurations and/or applications involved in or for performing functions and actions of embodiments herein.

Moreover, said the second wireless device 121 may comprise a processing circuit 1004 as exemplifying one or more hardware module and may comprise or correspond to one or more processors. In some embodiments, the processing module 1001 may comprise, e.g. 'is embodied in the form of' or 'realized by' the processing circuit 1004. In these embodiments, the memory 1002 may comprise the computer program 1003 executable by the processing circuit 1004, whereby the second wireless device 121 is operative, or configured, to perform said method and/or actions.

Typically, the second wireless device 121 comprises an Input/Output (I/O) module 1005, configured to be involved in, e.g. by performing, any communication to and/or from other units and/or nodes. The I/O module 1005 may be exemplified by an obtaining, e.g. receiving, module and/or a providing, e.g. sending or transmitting, module, when applicable.

In further embodiments, the second wireless device 121, e.g. the processing module 1001, may comprise an obtaining module 1006, a sending module 1007, an estimating module 1008 and/or a receiving module 1009, as exemplifying hardware and/or software module(s).

Therefore, according to the various embodiments described above, the second wireless device 121, and/or the processing module 1001 and/or the processing circuit 1004 and/or the I/O module 1005 and/or the obtaining module 1006, are operative, or configured, to obtain said information indicating the first wireless device 120 as member and positioning representative of the group and the second wireless device 121 as further member of the group.

Moreover, according to the various embodiments described above, the second wireless device 121, and/or the processing module 1001 and/or the processing circuit 1004 and/or the I/O module 1005 and/or the sending module 1007, are operative, or configured, to send, to the first wireless device 120 over said direct communication link 125, said estimated position information.

According to some of the various embodiments described above, the second wireless device 121, and/or the processing module 1001 and/or the processing circuit 1004 and/or the I/O module 1005 and/or the estimating module 1008, are operative, or configured, to estimate said estimated position of said second wireless device 121 based on said communication of positioning supporting information over said direct communication link 125.

Further, according to some of the various embodiments described above, the second wireless device 121, and/or the processing module 1001 and/or the processing circuit 1004 and/or the I/O module 1005 and/or the receiving module 1009 are, for said communication of positioning supporting information, operative, or configured, to receive, from the first wireless device 121, said positioning aiding information over said direct communication link 125.

Figure 11:
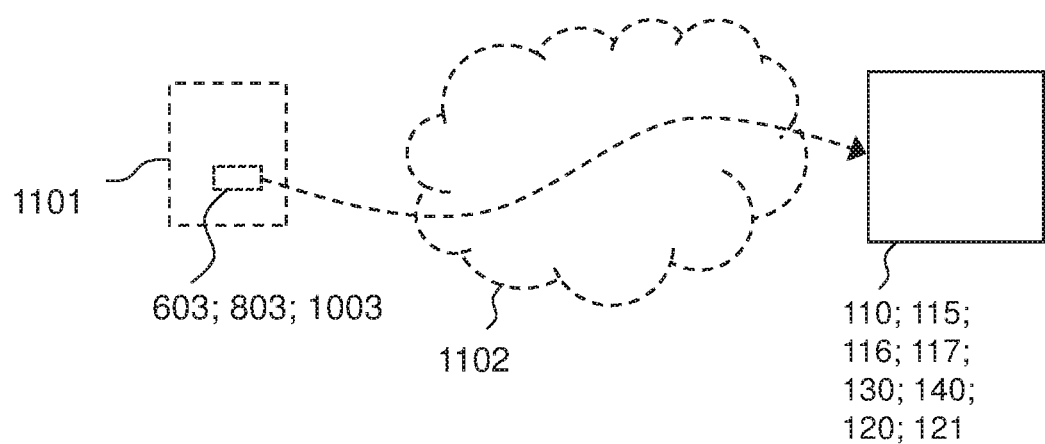
FIG. 11 is a schematic drawing illustrating embodiments relating to computer program(s) and carriers thereof to cause said one or more nodes, said first wireless device and said second wireless device to perform method actions.

FIG. 11 is a schematic drawing illustrating some embodiments relating to computer program(s) and carriers thereof to cause said one or more nodes, the first wireless device and the second wireless device, discussed above in relation to FIGS. 5-10, to perform the method actions. The computer program(s) may be any one of the computer programs 603, 803, 1003, and comprise(s) instructions that when executed by the respective processing circuit and/or the processing module, causes said one or more nodes and/or the first wireless device and/or the second wireless device to perform as described above. In some embodiments there is provided a carrier, or more specifically a data carrier, e.g. a computer program product, comprising one or more of the computer programs 603, 803, 903. The carrier may be one of an electronic signal, an optical signal, a radio signal, and a computer readable storage medium, e.g. a computer readable storage medium 1101 as schematically illustrated in the figure. One or more of the computer programs 603, 803, 903 may thus be stored on the computer readable medium 1101. By carrier may be excluded a transitory, propagating signal and the data carrier may correspondingly be named non-transitory data carrier. Non-limiting examples of the data carrier being a computer readable storage medium is a memory card or a memory stick, a disc storage medium such as a CD or DVD, or a mass storage device that typically is based on hard drive(s) or Solid State Drive(s) (SSD). The computer readable storage medium 1101 may be used for storing data accessible over a computer network 1102, e.g. the Internet or a Local Area Network (LAN). Some or all of the computer programs 603, 803, 903 may furthermore be provided as pure computer program(s) or comprised in a file or files. The file or files may be stored on the computer readable storage medium 1101 and e.g. available through download e.g. over the computer network 1102 as indicated in the figure, e.g. via a server. The server may e.g. be a web or File Transfer Protocol (FTP) server. The file or files may e.g. be executable files for direct or indirect download to and execution on said one or more nodes to make said one or more nodes to perform as described above, e.g. by execution by the processing circuits(s). The file or files may also or alternatively be for intermediate download and compilation involving the same or another processor to make them executable before further download and execution causing said one or more nodes and/or the first wireless device and/or the second wireless device to perform as described above.

Note that any processing module(s) mentioned in the foregoing may be implemented as a software and/or hardware module, e.g. in existing hardware and/or as an Application Specific Integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the node(s) and device(s) to be configured to and/or to perform the above-described methods and actions.

Identification by any identifier herein may be implicit or explicit. The identification may be unique in a certain context, e.g. in the wireless communication network or at least in a relevant part or area thereof.

The term "network node" or simply "node" as used herein may as such refer to any type of node that may communicate with another node in and be comprised in a communication network, e.g. the wireless communication network 100 or the further network 140. Further, such node may be or be comprised in a radio network node (described below) or any network node, which e.g. may communicate with a radio network node. Examples of such network nodes include any radio network node, a core network node, Operations & Maintenance (O&M), Operations Support Systems (OSS), Self Organizing Network (SON) node, etc.

The term "radio network node" as may be used herein may as such refer to any type of network node for serving a wireless device, e.g. a so called User Equipment or UE, and/or that are connected to other network node(s) or network element(s) or any radio node from which a wireless device receives signals from. Examples of radio network nodes are Node B, Base Station (BS), Multi-Standard Radio (MSR) node such as MSR BS, eNB, eNodeB, gNB, network controller, RNC, Base Station Controller (BSC), relay, donor node controlling relay, Base Transceiver Station (BTS), Access Point (AP), New Radio (NR) node, transmission point, transmission node, node in distributed antenna system (DAS) etc.

Each of the terms "wireless device", "user equipment" and "UE", as may be used herein, may as such refer to any type of wireless device arranged to communicate with a radio network node in a wireless, cellular and/or mobile communication system, and may thus be referred to as a wireless communication device. Examples include: target devices, device to device UE, device for Machine Type of Communication (MTC), machine type UE or UE capable of machine to machine (M2M) communication, Personal Digital Assistant (PDA), iPAD, Tablet, mobile, terminals, smart phone, Laptop Embedded Equipment (LEE), Laptop Mounted Equipment (LME), Universal Serial Bus (USB) dangles etc.

While some terms are used frequently herein for convenience, or in the context of examples involving other a certain, e.g. 3GPP or other standard related, nomenclature, it must be appreciated that such term as such is non-limiting Also note that although terminology used herein may be particularly associated with and/or exemplified by certain communication systems or networks, this should as such not be seen as limiting the scope of the embodiments herein to only such certain systems or networks etc.

As used herein, the term "memory" may refer to a data memory for storing digital information, typically a hard disk, a magnetic storage, medium, a portable computer diskette or disc, flash memory, random access memory (RAM) or the like. Furthermore, the memory may be an internal register memory of a processor.

Also note that any enumerating terminology such as first node, second node, first base station, second base station, etc., should as such be considered non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

As used herein, the expression "transmit" and "send" are typically interchangeable. These expressions may include transmission by broadcasting, unicasting, group-casting and the like. In this context, a transmission by broadcasting may be received and decoded by any authorized device within range. In case of unicasting, one specifically addressed device may receive and encode the transmission. In case of group-casting, e.g. multicasting, a group of specifically addressed devices may receive and decode the transmission.

When using the word "comprise" or "comprising" it shall be interpreted as nonlimiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. One or more nodes configured for managing position information associated with a group of wireless devices configured to be served in a wireless communication network, wherein the one or more nodes comprise:
communication circuitry configured for communicating directly or indirectly with the group of wireless devices; and
processing circuitry operatively associated with the communication circuitry and configured to:
obtain information indicating a first wireless device as a member and positioning representative of the group and at least one other, second, wireless device as a further member of the group, wherein the at least one second wireless device is able to communicate wirelessly and directly with the first wireless device over a direct communication link; and
receive, from the first wireless device, group position information being position information associated with the group and relating to at least an estimated position of the at least one second wireless device that is based on communication of positioning supporting information over the direct communication link,
wherein the communication of the positioning supporting information comprises positioning aiding information received by the at least one second wireless device from the first wireless device over the direct communication link, and
wherein the positioning aiding information comprises an indication of a direction of movement of the first wireless device.

2. The one or more nodes as claimed in claim 1, wherein the positioning aiding information comprises one or more of the following: an estimated position of the first wireless device; a velocity of the first wireless device; and information on a direction of a radio beam serving the first wireless device.

3. The one or more nodes as claimed in claim 1, wherein the communication of the positioning supporting information over the direct communication link relates at least partly to ranging estimation performed between the first wireless device and the at least one second wireless device over the direct communication link.

4. The one or more nodes as claimed in claim 1, wherein the estimated position of the at least one second wireless device is estimated in relation to a position of the first wireless device.

5. The one or more nodes as claimed in claim 1, wherein the processing circuitry is configured to obtain the information by:
receiving, from the first wireless device and at least one second wireless device, status information that per device comprises one or more indications on the following: a position associated with the device; an identifier of a radio beam serving the device; a time duration for remaining in the group; one or more operative positioning capabilities of the device; and a positioning accuracy provided by the device; and
determining the first wireless device as the positioning representative based on the received status information.

6. The one or more nodes as claimed in claim 5, wherein the determination of the first wireless device as the positioning representative is further based on whether the first wireless device fulfills one or more of the following criteria: has a certain location in the group; is associated with a certain time to remain in group; is associated with a certain operative positioning capability and/or operative positioning accuracy.

7. A first wireless device configured for managing position information associated with a group of wireless devices configured to be served in a wireless communication network, wherein the first wireless device comprises:
transceiver circuitry configured for communicating with the wireless communication network and with other wireless devices; and
processing circuitry operatively associated with the transceiver circuitry and configured to:
obtain information indicating the first wireless device as a member and positioning representative of the group and indicating at least one other, second, wireless device as a further member of the group, wherein the at least one second wireless device is able to communicate wirelessly and directly with the first wireless device via the transceiver circuitry over a direct communication link; and
receive, from the at least one second wireless device over the direct communication link, estimated position information comprising an estimated position of the at least one second wireless device that is based on communication of positioning supporting information over the direct communication link,
wherein the processing circuitry is configured communicate the positioning supporting information by sending, based on the obtained information, to the at least one second wireless device, positioning aiding information over the direct communication link, and
wherein the positioning aiding information comprises an indication of a direction of movement of the first wireless device.

8. The first wireless device as claimed in claim 7, wherein the positioning aiding information comprises one or more of the following: an estimated position of the first wireless device; a velocity of the first wireless device; and information on a direction of a radio beam serving the first wireless device.

9. The first wireless device as claimed in claim 7, wherein the communication of positioning supporting information over the direct communication link relates at least partly to ranging estimation performed between the first wireless device and the at least one second wireless device over the direct communication link.

10. The first wireless device as claimed in claim 7, wherein the estimated position of the at least one second wireless device is estimated in relation to a position of the first wireless device.

11. The first wireless device as claimed in claim 7, wherein the processing circuitry is further configured to:
send, to the wireless communication network via the transceiver circuitry, group position information that is position information associated with the group and based on the received estimated position information.

12. A second wireless device configured for managing position information associated with a group of wireless devices configured to be served in a wireless communication network, wherein the second wireless device comprises:

transceiver circuitry configured for communicating with the wireless communication network and with other wireless devices; and processing circuitry operatively associated with the transceiver circuitry and configured to:

obtain information indicating a first wireless device as a member and positioning representative of the group and indicating the second wireless device as a further member of the group, wherein the second wireless device is able to communicate wirelessly and directly with the first wireless device over a direct communication link; and send, to the first wireless device over the direct communication link, estimated position information comprising an estimated position of the second wireless device that is based on communication of positioning supporting information over the direct communication link, wherein the processing circuitry is configured to communicate the positioning supporting information over the direct communication link by:

receiving, from the first wireless device via the transceiver circuitry, positioning aiding information over the direct communication link, wherein the positioning aiding information comprises an indication of a direction of movement of the first wireless device.

13. The second wireless device as claimed in claim 12, wherein the processing circuitry is further configured to:

estimate the estimated position of the second wireless device based on the communication of positioning supporting information over the direct communication link.

14. The second wireless device as claimed in claim 12, wherein the positioning aiding information comprises one or more of the following: an estimated position of the first wireless device; a velocity of the first wireless device; and information on direction of a radio beam serving the first wireless device.

15. The second wireless device as claimed in claim 12, wherein the communication of positioning supporting information over the direct communication link relates at least partly to ranging estimation performed between the first wireless device and the second wireless device over the direct communication link.

16. The second wireless device as claimed in claim 12, wherein the estimated position of the second wireless device is estimated in relation to a position of the first wireless device.

* * * * *